United States Patent
Busse et al.

(10) Patent No.: US 7,351,138 B2
(45) Date of Patent: *Apr. 1, 2008

(54) SYSTEMS AND METHODS FOR SIMULATING GAME STATE CHANGES RESPONSIVE TO AN INTERRUPT CONDITION

(75) Inventors: Marco Busse, Apopka, FL (US); Steve Chiang, Longwood, FL (US)

(73) Assignee: Electronic Arts Inc., Redwood City, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 10/828,597

(22) Filed: Apr. 20, 2004

(65) Prior Publication Data

US 2004/0198480 A1    Oct. 7, 2004

Related U.S. Application Data

(63) Continuation of application No. 10/154,397, filed on May 17, 2002, now Pat. No. 6,733,383.

(51) Int. Cl.
*A63F 13/00* (2006.01)
(52) U.S. Cl. ............... 463/1; 463/6; 463/36; 463/58
(58) Field of Classification Search .............. 463/1, 463/6, 29, 36, 58, 59; 434/29, 62, 64; 707/91
See application file for complete search history.

(56) References Cited

U.S. PATENT DOCUMENTS

| | | | |
|---|---|---|---|
| 4,247,107 A | 1/1981 | Smith, III et al. | |
| 5,921,780 A | 7/1999 | Myers | |
| 6,080,063 A | 6/2000 | Khosla | |
| 6,095,522 A | 8/2000 | Spell et al. | |
| 6,109,186 A | 8/2000 | Smith et al. | |
| 6,193,610 B1 | 2/2001 | Junkin | |
| 6,461,238 B1* | 10/2002 | Rehkemper et al. | 463/6 |
| 2002/0147050 A1 | 10/2002 | Weiss et al. | |
| 2002/0169013 A1 | 11/2002 | Serizawa et al. | |
| 2006/0154710 A1* | 7/2006 | Serafat | 463/1 |

* cited by examiner

*Primary Examiner*—Ronald Laneau
(74) *Attorney, Agent, or Firm*—Townsend and Townsend and Crew LLP

(57) ABSTRACT

A simulation module simulates events that may occur during a cautionary period based on, e.g., current relative position of vehicles, vehicle and driver attributes and current game statistics for vehicles, and compiles new statistics and attributes that are used in the resumed race. A full race simulation option and a partial race simulation option are also provided. For example, in a season mode, the simulation module simulates events that may occur during a race and compiles statistics that can be used later, e.g., in a later race, for season standings, etc. A complete race may be simulated, or a partial race may be simulated, for example, if a user desires to terminate a race before it is finished, using the compiled statistics, and a new set of statistics compiled to track the simulated race events. Real world statistics are imported and used in some aspects. For example, real world standings, performance statistics and attribute information are stored in a database and are used as a basis for AI-controlled vehicle performance and AI-generated simulation results.

26 Claims, 2 Drawing Sheets

SYSTEMS AND METHODS FOR SIMULATING GAME STATE CHANGES RESPONSIVE TO AN INTERRUPT CONDITION

BACKGROUND OF THE INVENTION

The present invention relates generally to simulated racing games, and more particularly to simulating race statistics and results for portions of a race or a full race or responsive to an interrupt condition during a simulated race.

Yellow Flags (cautions) are a major facet of racing sports such as NASCAR racing. There are a multitude of strategies and positional changes that result from a yellow flag caused by a wreck, spin, or other event. For example, a yellow flag provides an opportunity for cars to take pit stops, cars to bunch up, and lapped cars to catch up and become unlapped. In simulated racing games, such as NASCAR Thunder™ 2002, Yellow Flag options may be provided to enhance the reality of the game to conform with events as would take place in a real world race (e.g., a NASCAR-sanctioned race). However, in such simulated racing games, many people often refrain from activating a Yellow Flag enabling option due to the tedium of watching cars pace around the track slowly, e.g., 3 laps or more, during the cautionary period. It is therefore desirable to provide racing games that keep the strategy and gameplay associated with cautionary events such as would occur with activated Yellow Flag options, but which allow one to remove the perceived tedium previously associated with such game options.

Further, in current racing games, when participating in a scheduled season, or tuning, there is generally no way to progress through the schedule without entering and racing or quitting out of each race in the schedule. This can make tuning, or gameplay, a very time consuming process. It is therefore desirable to provide racing games that allow a user to simulate complete races or partial races, for example, to facilitate tuning and/or quick progression through a season mode.

BRIEF SUMMARY OF THE INVENTION

The present invention provides simulation methods that enhance the reality of a racing game and also reduce perceived tedium associated with interrupt events, for example, cautionary events such as Yellow Flag events or user selected interrupts such as race termination. The present invention also provides for enhanced full race simulation and partial race simulation. In general, as used herein, "interrupt" or "interrupt event" is intended to refer to an interrupt condition responsive to a game event that causes an interruption in normal game play, which may be completely AI generated, completely user generated, or partially AI generated and partially user generated, such as a user selection responsive to a computer generated event.

To overcome delays inherent due to Yellow Flag or other cautionary events, the present invention provides the player with the ability to skip ahead, yet simulate real life events that would occur during the caution period. The player(s) are not forced to watch the entire pace lap when a Yellow Flag or other cautionary event occurs. The most exciting or interactive parts are left available to the user (such as the option to pit, or the ability to race back to the start/finish line at the onset of a caution in a race such as a NASCAR race), but the more tedious parts of the caution event are skipped over and simulated. The user is then placed in a position to restart the race, and that position is determined by both the actual user actions as well as the simulated events that occurred during the cautionary period. A simulation module simulates events that may occur during the cautionary period based on, e.g., current relative position of vehicles, attributes and current statistics for vehicles, whether or not other vehicles choose to make a pit stop etc., and compiles new statistics and attributes that are used in the resumed race. This break in the action also provides an opportunity for other features to be presented to the user, e.g., to add statistic banners, wreck replays, and race recaps without worry about interrupting the race action.

A full race simulation option and a partial race simulation option are also provided. These options are particularly useful for situations where statistics are accumulated for a race or set of races (e.g., for a season). For example, in a season mode, the person who is tuning or playing the season does not have to enter and exit every race on the season schedule in order to properly obtain statistics from the races. The present invention is useful for game designers creating or tuning races, and for players. For players, the present invention is particularly beneficial when a player wants to simulate a race, or portion of a race, because they don't want to spend the time, or have no interest in a particular race or portion of a race.

A simulation module simulates events that may occur during a race and compiles statistics that can be used later, e.g., in a later race, for season standings, etc. Such statistics may include performance related statistics (e.g., lap times, total time, position relative to other vehicles, etc.) and attribute information (e.g., aggressiveness of driver, wear of vehicle, tires, suspension, etc.). Not only can a complete race be simulated, but a partial simulation of a race is also an option. For example, if a player decides to terminate a race before it is actually finished, the simulation module can make a determination of the outcome of the race using already compiled statistics and the performance of the individual cars in the race up to that point. This also benefits season statistics tracking and calculation as the generated set of data ensures that the season's statistics are intact and properly calculated. Multiple race simulations, or multiple season simulations may also be performed in certain aspects.

A simulation module according to the present invention allows one to simulate the next race within a season or a career from the front end without entering the actual race. The module preferably has access to all of the information about the vehicles participating in the race and their attributes in order to produce appropriate simulation data. Real world statistics are imported and used in some aspects. For example, real world standings, performance statistics and attribute information are stored in a database and are used as a basis for AI-controlled vehicle performance and AI-generated simulation results.

The simulation module is configurable to execute and simulate and compile end of race statistics when a player quits out of a race, wrecks out of a race, or wins a race where some computer generated (AI generated) vehicles have not visibly finished the race.

According to an aspect of the present invention, a method is provided for simulating game state changes responsive to an interrupt condition in a computer-implemented racing game. The method typically involves interrupting the normal game state which already has a set of statistics associated with it. The method then allows for parts of the interrupted game state to be simulated in conjunction with possible user interaction, in order to derive an updated set of statistics which reflect the results of this interrupted game state. Typically, the game state is then returned to the normal game state or some type of conclusionary game state such as the end of the race.

According to another aspect of the present invention, a method is provided for simulating game state changes responsive to an interrupt condition in a computer-implemented racing game. The method typically includes generating an interrupt condition during the racing game at a first game state, the first game state having a first set of statistics associated therewith, and responsive to the interrupt condition, simulating events that occur after the first game state based on the first set of statistics so as to produce a second set of statistics associated with a second game state. The method also typically includes resuming the racing game in the second game state. The second game state may be associated with an active state of the race, e.g., before the end of the race, or it may be associated with the end of the race.

According to another aspect of the present invention, a computer readable medium is provided that includes code for controlling a processor to simulate game state changes responsive to an interrupt condition during a race in a racing game. The code typically includes instructions to retrieve a first set of statistics associated with a first game state from a database in response to an interrupt condition, simulate events that occur after the first game state based on the first set of statistics so as to produce a second set of statistics associated with a second game state, and store the second set of statistics to the data base. The second game state may be associated with an active state of the race, e.g., before the end of the race, or it may be associated with the end of the race. The second or later sets of statistics may be stored as files separate from the first set of statistics, or each subsequent statistics file may be incorporated with the prior file so that one set of accumulated statistics is stored.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

Figure 1:
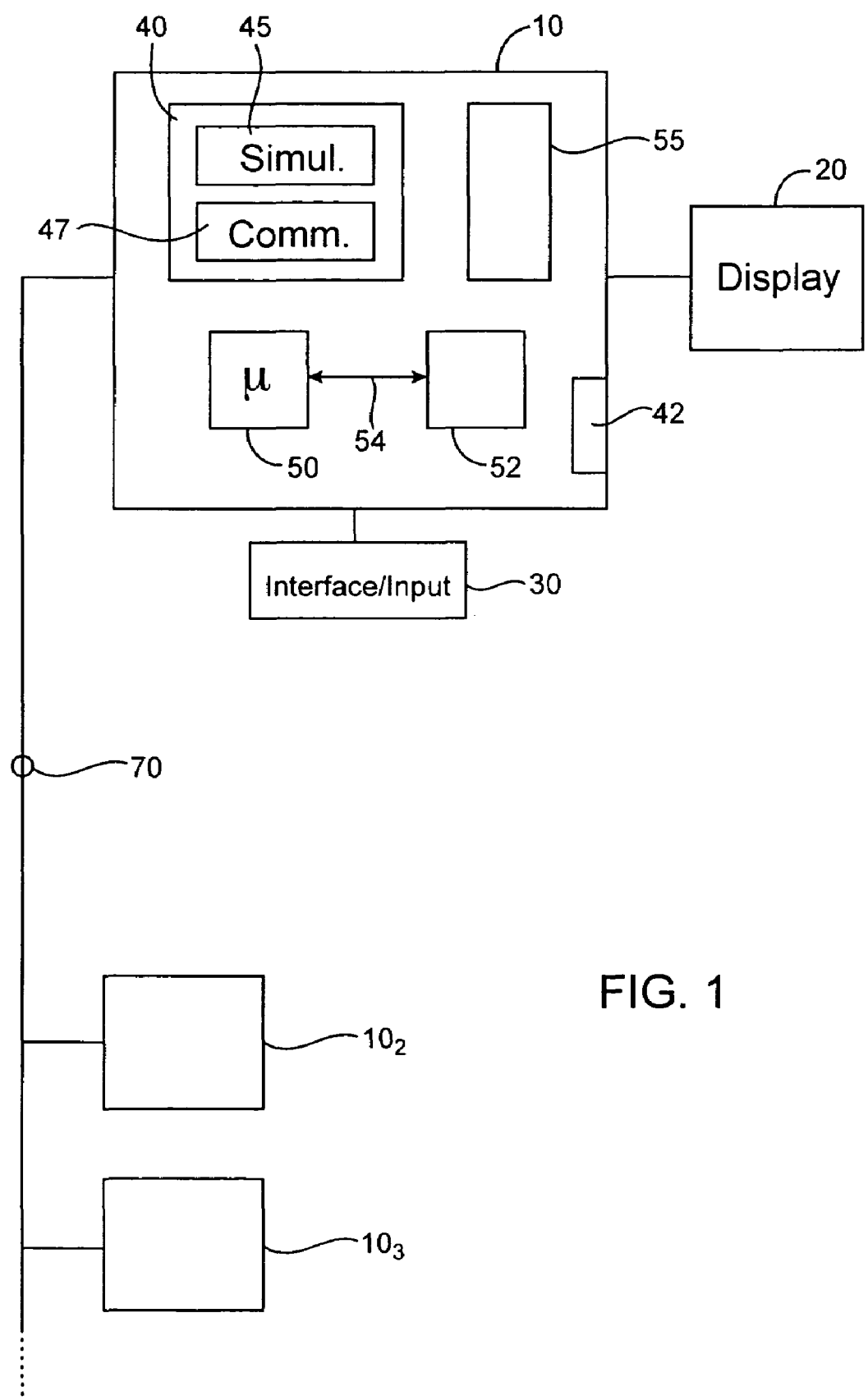
FIG. 1 illustrates a computer system configured with an executable gaming application according to an embodiment of the present invention.
Figure 2:
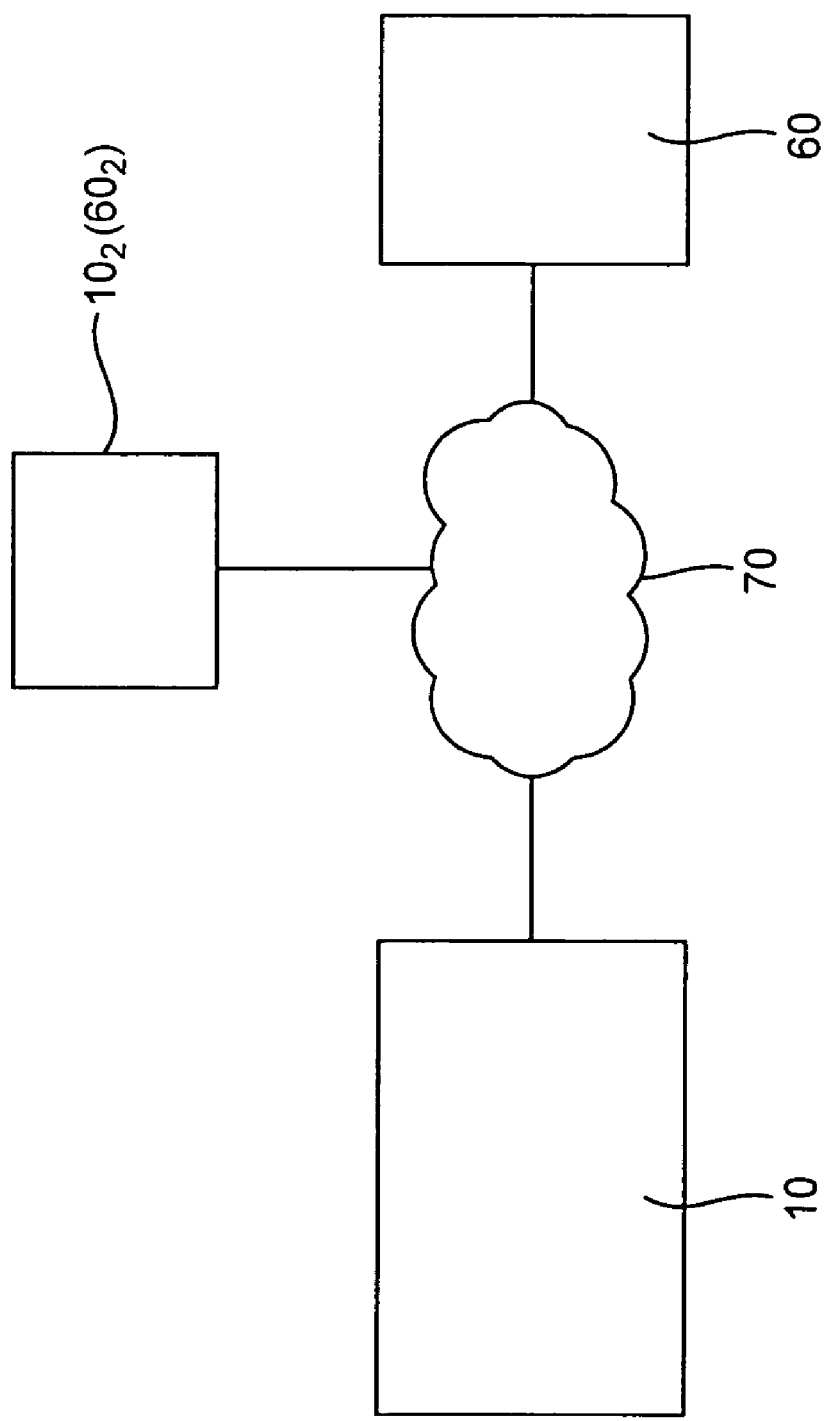
FIG. 2 illustrates a client-server arrangement for executing a gaming application according to an embodiment of the present invention.

FIG. 1 illustrates a client computer system 10 configured with a gaming application (application module 40) according to the present invention. FIG. 2 illustrates a client-server arrangement for executing a shared gaming application according to another embodiment of the present invention. Client system 10 may operate as a stand-alone system or it may be connected to server 60 and/or other client systems 10 over a network 70.

Several elements in the system shown in FIGS. 1 and 2 include conventional, well-known elements that need not be explained in detail here. For example, a client system 10 could include a desktop personal computer, workstation, laptop, stand-alone game system such as a Sony Playstation2™, X-Box™, Nintendo GameCube™, etc., or any other computing device capable of executing gaming application module 40. In client-server or networked embodiments, a client system 10 is configured to interface directly or indirectly with server 60, e.g., over a network 70, such as the Internet, or directly or indirectly with one or more other client systems 10 over network 70. Client system 10 typically runs a browsing program, such as Microsoft's Internet Explorer, Netscape Navigator, Opera or the like, allowing a user of client system 10 to access, process and view information and pages available to it from server system 60 or other server systems over Internet 70. Client system 10 also typically includes one or more user interface devices 30, such as a keyboard, a mouse, touchscreen, pen or the like, for interacting with a graphical user interface (GUI) provided on a display 20 (e.g., monitor screen, LCD display, etc.). In preferred aspects, user interface device 30 includes a mouse, joystick, steering wheel, gas pedal, force-feedback controller, or other game-specific controller. Speakers are also provided for audio feedback. Multiple user interface devices may be provided for concurrent use by multiple users such as in a multiplayer mode.

In one embodiment, application module 40 executes entirely on client system 10, however, in some embodiments the present invention is suitable for use in networked environments, e.g., client-server, peer-peer, or multi-computer networked environments where portions of code may be executed on different systems. Interconnection via the Internet is preferred, however, it should be understood that other networks can be used instead of the Internet, such as an intranet, an extranet, a virtual private network (VPN), a non-TCP/IP based network, any LAN or WAN or the like.

According to one embodiment, client system 10 and some or all of its components are operator configurable using gaming application module 40, which includes computer code executable a central processing unit 50 such as an Intel Pentium processor or the like coupled to other components over one or more busses 54 as is well known. Computer code including instructions for operating and configuring client system 10 to process game and data content, simulate race events and statistics, and render images as described herein is preferably stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital video disk (DVD) medium, a floppy disk, and the like. An appropriate media drive 42 is provided for receiving and reading data and code from such a computer-readable medium. Additionally, the entire program code of module 40, or portions thereof, may be transmitted and downloaded from a software source, e.g., from server system 60 to client system 10 or from another server system or computing device to client system 10 over the Internet as is well known, or transmitted over any other conventional network connection (e.g., extranet, VPN, LAN, etc.) using any communication medium and protocols (e.g., TCP/IP, HTTP, HTTPS, Ethernet, etc.) as are well known. It should be understood that computer code for implementing aspects of the present invention can be implemented in a variety of coding languages such as C, C++, Java, Visual Basic, and others, or any scripting language, such as VBScript, JavaScript, Perl or markup languages such as XML, that can be executed on client system 10 and/or in a client server arrangement. In addition, a variety of languages can be used in the external and internal storage of data, e.g., statistics information, according to aspects of the present invention.

According to one embodiment, a game application (represented as module 40) executing on client system 10 includes instructions for implementing a racing game, including simulations as described herein. Application 40 is preferably downloaded and stored in a hard drive 52 (or other memory such as a local or attached RAM or ROM), although application module 40 can be provided on any software storage medium such as a floppy disk, CD, DVD, etc. as discussed above. In one embodiment, application module 40 includes various software modules for processing data content, such as a communication interface module 47 for communicating text and data to a display driver for rendering images on display 20, and for receiving user input signals from user input device 30. Application module 40 also includes a simulation module 45 including instructions to simulate race events and related statistics using compiled statistics and attribute information as discussed herein. Compiled statistics, attributes and other information are preferably stored in database 55, which may reside in memory 52, in a memory card or other memory or storage system, for retrieval by simulation module 45. It should be appreciated that application module 40, or portions thereof, as well as appropriate data can be downloaded to and executed on client system 10.

In the client-server arrangement of FIG. 2, portions of game module 40 may execute on client 10 while portions may execute on server 60. For example, a game module shell may execute on client 10 with periodic data, e.g., vehicle positional and statistical information, updates provided to and from server 60. Similarly, in a networked environment, updates may be provided between computers, such as in a multi-player mode over the Internet.

In preferred aspects, application module 40 implements a simulated vehicle racing game, such as an auto race, bicycle race or motorcycle race, boat race or jet ski race, snowmobile race, etc. It should be appreciated that other racing games may be implemented, such as dog races, horse races or track and field type races, in which case, a living body is typically a user-controlled or computer-controlled "vehicle". One or more vehicles may be controlled by one or more users, and one or more vehicles may be controlled by the computer (AI controlled vehicles).

Typically, the simulated race is conducted on a course or a track requiring one or more laps and/or passing required checkpoints. Various viewpoints are typically provided to the user on the display during the course of the race. For example, portions of the course and other vehicles may be displayed from the viewpoint of the user's vehicle, from above, and from a point along the course. Additionally, various other display elements may be concurrently displayed, or alternately displayed as a different window at the request of the user. Such display elements include performance statistics and elements such as speed indicators, speed, average lap time, etc., vehicle attributes such as fuel level indicators, fatigue, temperature and pressure indicators, etc., and other display elements as may be suitable for simulating a real-life racing environment.

The present invention will now be described with reference to an auto race, such as a NASCAR-sanctioned type race, although the present invention is applicable to other races as mentioned above.

In NASCAR racing, a vehicle is required to make multiple laps to complete the race. During the race, it is typically necessary to make pit stops, for example to refuel, change or take on new tires, etc. Additionally, during the race, cautionary events such as wrecks, spin-outs, debris on the track, etc., may take place based on, for example, a user input that causes or contributes to the event, or AI-generated events. Typically a Yellow Flag is shown to the racers during such a cautionary event, and a pace car enters the field to pace the cars during the cautionary event. Cars may make pit stops, catch up to the rest of the pack or maintain their present positions as desired or as strategy dictates.

For added reality, cautionary events are added to the gameplay of the present invention. For example, activation of a "Yellow Flag" option allows the computer to simulate cautionary events as well as the resulting "Yellow Flag" period.

According to one embodiment, a user selectable "Quick Cautions" option is added to modify or supplement the "Yellow Flag" option. When selected, the "Quick Cautions" option allows the user to skip through much or all of the cautionary event period yet simulate events that occur during the period. For example, a user may select to make a pit stop to refuel, and then is placed back in an appropriate position to restart/resume the race after the pit stop based on AI-generated position changes occurring during the cautionary period.

An example process flow will now be described with reference to examples of visual display characteristics and control characteristics and functions presented to the user. According to one embodiment, an example of a "Quick Cautions" flow proceeds as follows:

1) Yellow Flag Event Occurs

Visual: Regular racing view with waving yellow flag indicator.

Control: Regular racing controls until the player crosses the line, unless player stops, significantly slows, or turns around.

2) Player Crosses the Start/Finish Line

Visual: Track/demo cameras focused on the player car or track/demo cameras focused on the start finish line.

Control: No player control.

Function: The order of cars lining up correctly will be simulated behind the scenes. The cars will start to line up normally until 2a) occurs. At that point, any remaining movement necessary in to line-up the cars for pacing is simulated when the transition to 3) occurs. Fuel and tire wears are preferably used on a per lap basis, e.g., if a decision to pit is made and before a restart occurs. Fuel usage is simulated on a per lap basis, regardless of whether a decision to pit is made or not. Also, in some situations (e.g., short races) fuel usage is not calculated.

2a) 5 seconds After Last Player Crosses the Start/Finish Line

Visual: Track/demo cameras focused on pace car leaving pit road or track/demo cameras focused on the pace car pulling out in front of the line of cars on the backstretch.

Control: No player control.

Function: After the last player crosses the line, the cars are ordered as they were when they crossed the line. Lapped cars are mixed in where they crossed the line.

3) After Pace Car Pulls Out

Visual: Track/demo cameras focused on the player. Cars in a single-file line led by the pace car on the back stretch. A 'Pit Under Caution?' pop-up or other selectable option is displayed. The player's remaining fuel, tires, and damage meters are preferably shown.

Control: Select 'Yes' or 'No' using controller, e.g., D-Pad and X (A for Xbox).

Function: The cars are lined up as in 2a). A pop-up is presented indicating whether or not the player wants to make a pit stop. The player has until the pop-up is scheduled to go away in order to decide to pit. If the player hasn't made a decision, it is taken as 'No.' If there are cars in front of the player, they begin to enter the pit row (if they decide to pit or a decision is made for them to pit) before the pit query is dismissed. If the player selects No, they are taken to 5a) after a set time, e.g., 2 seconds. In multiplayer mode, wait until every player has made a decision.

4) Decision is Made to Pit.

Visual: Cars continuing to pace and entering pit road using Track/demo cameras focused on the player. A Pit Options menu is preferably displayed, including, e.g., options to refuel, replace tires, etc.

Control: The player uses a controller, e.g., D-pad and X to make selections on the Pit Options menu.

Function: The player is preferably presented with the Pit Options menu as soon as they enter pit road. In multiplayer mode, if all players select Abort, the flow immediately moves to 5a). The Pit Options menu remains on the screen until a selection is made. Then it is taken away and the currently selected option(s) are used. If a Fuel Use mode is set to ON, the amount of fuel remaining in the cars is decreased by the amount of fuel it takes to run the entire caution period. However, the player's fuel cannot go below zero—their car will be considered as having successfully coasted to pit road.

5) Pit Stop

Visual: Car entering pit stall with cameras from side or driver's view. A pit timer is preferably presented. AI-controlled cars that made the decision to pit (as determined by simulation module 45 based on statistics and attributes for that car) are preferably made visible moving down pit road or in their stall depending upon their place in the caution line and pit row. After the stop is finished, the car is shown exiting its pit stall.

Control: No player control

Function: The pit stop proceeds with camera cuts and audio. After the car is shown exiting its pit stall, the flow moves to 5a). In multiplayer mode, the lead car's pit stop is preferably presented in a single window.

5a) Fuel Check

Function: At this point, a transition occurs from the Pit Stop (or pace) stage back to the Resume/Restart stage of the flow. Once again, the amount of fuel available to the player (if a Fuel Use mode is set to ON) is decreased in order to represent the amount of fuel which would actually be used during the remainder of the caution period.

6) Resume/Restart

Visual: Similar to race start. The camera is preferably in the player's driving view and the countdown is given. Pace car is already gone or is shown leaving.

Control: Player has regular race countdown controls.

Function: The cars are lined up and ready to start. The current lap is updated to reflect the number of caution laps that were 'run.' If pitting has occurred, position swaps have probably occurred as determined by simulation module 45. For example, cars who did not pit are moved in front of cars who pitted maintaining their relative initial caution positions. Cars who pitted are ordered behind them in order of pit stop speed. In order to keep the $43^{rd}$ car from getting in front of the $1^{st}$ car during pitstops, for example, some time based upon a car's position is added to the pitstop time. Lapped cars are lined up on the inside, unless the restart is occurring with 10 or less laps to go. In that case, they are positioned at the end of the line.

Finish Race Under Caution

In certain aspects, a race is allowed to finish under caution if the number of laps remaining is equal to or less than the number of caution laps. For example, if there is only one lap remaining, a view of the pace car leading the cars across the start/finish line is presented after 3). If there are more than 2 laps remaining, proceed as normal until step 6). At that point, the same view of the pace car leading the cars across the start/finish line as above is presented. In other aspects, the race is not allowed to finish under caution. In this aspect, the pace laps are not counted, nor is a calculation of fuel consumption and tire use made.

Exemplary embodiments of full and partial race simulations follows:

Full Race and Partial Race Simulation:

In one embodiment, a full race simulation tool is provided. The tool is preferably accessed from within the front end of the game, for example, from a setup screen, or within a season mode configuration screen. In this embodiment, simulation module 45 retrieves all of the necessary driver statistics and attribute information (aggressiveness, control, etc.), vehicle statistics information (e.g., wear, average speed, etc.), so that it can provide a sensible simulation of the next race. For example, where a user has selected to model some or all competitors' cars, or their own car on real-world race cars and drivers, the application uses real world statistics and attributes taken from real world races. For example, real-world statistics and attributes data may be provided with the game application or as separate modules provided on a computer-readable medium, downloaded over a network, input/modified by a user, etc., and stored in the database. Thus, for AI-controlled cars, the simulation module retrieves statistics from the database for simulating events that occur during the race. For simulation of user-controlled cars, the simulation module retrieves statistics based on past races, if any, or randomly generated statistics.

A variety of weighting schemes may be applied to the retrieved statistics, e.g. to determine frequency of cautionary events based on driver aggressiveness and control values, relative performance based on past performance scores and attributes, etc. The simulation module generates a final set of statistics for the race, each car, and/or each driver, the results may be displayed explicitly as a table of results or, preferably as a summary of events that occurred, including for example, order of finish, total lap times, crashes, etc. The simulation module updates the database with all of the necessary race statistics, which are used to calculate season standings, break ties, determine awards winners, as well as all other information that is required to progress through a season. In this manner, the simulation results closely tie in with what a user may expect to see within a race that was actually run.

In one embodiment, a partial race may be simulated. For example, a user may select to simulate the beginning of a race and take over control of a car near the end of the race, a user may select to have an intermediate portion of the race simulated (e.g., "Quick Cautions" mode), or a user may choose to interrupt a game and quit out of a partially completed race, but have the race finish nonetheless, for example, for maintaining a database of compiled race statistics for a season.

For any simulation mode (Full or Partial Race, or Quick Cautions), the simulation module closely approximates what would happen within a race, e.g., during a cautionary period or if it were to continue until all driving cars cross the line under a checkered flag based upon the AI characteristics. The simulation proceeds similar to the full race simulation described above. As above, the module retrieves statistics for participant cars and generates all of the necessary events (passing, yellow flags, crashes, pit stop decisions, etc.) that are used to calculate the post-simulation statistics. When simulating the beginning of a race, the post simulation statistics are used to position cars for the user to complete the race; for a user quitting out of a race, the post-simulation statistics are recorded to the database for use in standings and/or a later race. The database is appropriately updated with the necessary end race statistics are used within the front end to calculate awards, season rankings, etc.

During any simulation mode the simulation module preferably generates mistakes for the AI-controlled cars, randomly and/or based on history information, driver attributes such as aggressiveness, current game condition of car attributes such as suspension and braking characteristics, track profile and characteristics, weather characteristics, etc. The simulation code generates random wrecks for the simulated drivers. The result of the random wrecks would reflect that the driver wrecked out of the race and any other information that is normally recorded for a wrecked car.

In one embodiment, the simulation results are dumped to a file so that they can be viewed before any calculations are performed on the data. This is not necessary to the design but it may prove to be a valuable tool, e.g., to allow a user to approve of simulation results before being recorded.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of simulating game state changes responsive to an interrupt condition in a computer-implemented racing game, comprising:
automatically generating an interrupt condition during game play of the racing game at a first game state, the first game state having a first set of statistics for a plurality of race participants;
responsive to said interrupt condition, interrupting game play and calculating a second set of statistics for an interrupt interval, wherein the second set of statistics are associated with a second game state representing the end of the interrupt interval for said plurality of race participants, and wherein the second set of statistics are calculated by simulating events that occur during the interrupt interval based on the first set of statistics; and
resuming game play of the racing game in the second game state.

2. The method of claim 1, wherein the interrupt condition is a computer generated condition.

3. The method of claim 2, wherein the interrupt condition includes a user entered selection responsive to the computer generated condition.

4. The method of claim 3, wherein the computer generated condition includes a yellow flag cautionary event, and wherein the user entered selection includes a decision to make a pit stop.

5. The method of claim 2, wherein the computer generated condition is a randomly generated cautionary event including one of a crash, a spinout and debris on the track.

6. The method of claim 1, wherein the first set of statistics includes, for each race participant, one or more of remaining fuel, tire wear, vehicle wear, and a relative order.

7. The method of claim 1, wherein the first set of statistics includes driver attributes for each race participant.

8. The method of claim 7, wherein the driver attributes includes at least one of aggressiveness, control and race history information.

9. The method of claim 1, wherein the first set of statistics includes a first order of race participants, and wherein the second set of statistics includes a second order of race participants different from the first order.

10. The method of claim 9, wherein resuming includes displaying at least a portion of the race participants in said second order.

11. The method of claim 9, wherein resuming includes restarting the race with the participants in said second order.

12. The method of claim 1, wherein each set of statistics includes for each of a plurality of race participants performance related statistics and attribute information.

13. The method of claim 12, wherein the performance related statistics includes for each race participant one or more of lap time, total time, and position relative to each other race participant.

14. The method of claim 12, wherein each race participant includes a vehicle, and wherein the attribute information includes for each vehicle one or more of aggressiveness of the driver, fuel level, vehicle wear, tire wear and suspension wear.

15. The method of claim 1, wherein the plurality of race participants includes one or more computer controlled race participants.

16. A computer-readable medium including code for controlling a processor to simulate game state changes responsive to an interrupt condition during a race in a racing game, the code including instructions to:
automatically generate an interrupt condition;
responsive to the interrupt condition, retrieve a first set of statistics for a plurality of race participants from a database, the first set of statistics associated with a first game state;
interrupt game play of the racing game in response to said interrupt condition;
calculate a second set of statistics for the plurality of race participants, wherein the second set of statistics are associated with a second game state representing an end of an interrupt interval, wherein the second set of statistics are calculated by simulating events that occur during the interrupt interval based on the first set of statistics; and
store the second set of statistics to the database.

17. The computer-readable medium of claim 16, wherein the interrupt condition is based on user input.

18. The computer-readable medium of claim 16, wherein the interrupt condition includes a user entered selection responsive to a computer generated interrupt condition.

19. The computer-readable medium of claim 18, wherein the computer-generated interrupt condition includes a yellow flag cautionary event, and wherein the user entered selection includes a decision to make a pit stop.

20. The computer-readable medium of claim 16, wherein the code further includes instructions to resume game play of the racing game in the second game state.

21. The computer-readable medium of claim 16, wherein the instructions to automatically generate the interrupt condition includes instructions to generate the interrupt event based on a portion of the first set of statistics.

22. The computer-readable medium of claim 16, wherein the instructions to retrieve include instructions to download the first set of statistics from the database over a network connection, and wherein the instructions to store include instructions to transmit the second set of statistics to the database over the network connection.

23. A computer implemented method of simulating a complete race in a racing game using game-related statistics, the method comprising:

downloading a first set of statistics for a plurality of race participants from a remote server module in response to a request to simulate a complete race, wherein the first set of statistics are associated with a beginning of the race; and calculating a second set of statistics associated with an end of the race based on the first set of statistics by simulating events that occur during the race, wherein each set of statistics includes performance related statistics and attribute information for each of the plurality of race participants.

24. The method of claim 23, further including transmitting the second set of statistics to the remote server module.

25. The method of claim 23, wherein each race participant includes a vehicle, and wherein the performance related statistics includes for each vehicle one or more of lap time, total time, and position relative to each vehicle.

26. The method of claim 23, wherein each race participant includes a vehicle, and wherein the attribute information includes for each vehicle one or more of aggressiveness of the driver, fuel level, vehicle wear, tire wear and suspension wear.

* * * * *